United States Patent [19]

Bixby et al.

[11] 4,193,098
[45] Mar. 11, 1980

[54] SEGMENTED VIDEO PLAYBACK APPARATUS WITH ANCILLARY RECORDING MEDIUM

[75] Inventors: James A. Bixby, San Diego; James U. Lemke, Del Mar; Robert A. Lentz, Rancho Santa Fe, all of Calif.

[73] Assignee: Spin Physics, Inc., San Diego, Calif.

[21] Appl. No.: 780,945

[22] Filed: Mar. 24, 1977

[51] Int. Cl.² ............... H04N 5/19; G11B 5/012; G11B 15/06
[52] U.S. Cl. ..................... 360/10; 360/9; 360/35
[58] Field of Search ................. 360/9–11, 360/14, 33, 35, 38

[56] References Cited

U.S. PATENT DOCUMENTS

| | | | |
|---|---|---|---|
| 2,874,214 | 2/1959 | Anderson | 360/35 |
| 3,395,248 | 7/1968 | Suzuki et al. | 360/10 |
| 3,454,713 | 7/1969 | Yanagimachi et al. | 360/10 |
| 3,557,320 | 1/1971 | Hopf | 360/10 |
| 3,662,101 | 5/1972 | Segerstrom | 360/10 |
| 3,721,757 | 3/1973 | Ettlinger | 360/14 |
| 3,999,218 | 12/1976 | Iyama et al. | 360/10 |

FOREIGN PATENT DOCUMENTS 45-26802  9/1970  Japan ......................... 360/10

Primary Examiner—Raymond F. Cardillo, Jr.
Attorney, Agent, or Firm—Robert F. Cody

[57] ABSTRACT

A system for playback of segmented video information on a tape employs an ancillary recording medium which is rotationally driven at a rotation rate of the primary segment scanning apparatus. Each segment of a video field is recorded in a respective track of the ancillary medium, the information of one field being recorded over the information of another field. By recording only signals of a predetermined quality on the ancillary recording medium, play back of video information from the ancillary medium will produce a coherent display on a display monitor, regardless of the rate at which the tape is run. This is possible because of the one-to-one correspondence between the rotary rates of the scanner and the ancillary medium. Each coherent display is comprised of information from one or a number of video fields.

10 Claims, 18 Drawing Figures

SEGMENTED VIDEO PLAYBACK APPARATUS WITH ANCILLARY RECORDING MEDIUM

BACKGROUND OF THE INVENTION

1. Field of the Invention

This invention relates in general to video recording apparatus, and in particular to apparatus for use in replaying segmented video at various speeds, e.g., fast or slow forward, or fast or slow reverse, or stopped, as may be required for the editing of video program material recorded on magnetic tape.

2. Description Relative to the Prior Art

The editing of video program material recorded on magnetic tape is a difficult job. Although there are some video recorders which record discrete fields or frames of video information across the width of a magnetic tape, most video recorders record segmented fields. Quadruplex recorders and many helical recorders fall into this category: A quadruplex recorder lays down 16 widthwise tracks, each track of which corresponds to 16.2 video lines, to record a single video field; a helical recorder such as the BCN recorder, produced by Robert Bosch, GMBH, Fernseh Division, Darmstadt, West Germany, lays down five slantwise tracks, each track of which corresponds to about 50 video lines, to record a video field. Because of the segmenting of the video field information, the recorder tape drive—say for purposes of program editing, etc.—cannot be run at any, or no, speed without employing elaborate, and expensive, buffering equipment, viz. an editing machine. One cannot merely plug, say, the playback signal of a variable tape speed quadruplex recorder into a monitor and get a meaningful display on the monitor, unless the quad tape is replayed at its record speed. Were recorded-on quadruplex tape to be stopped, the play heads would repeatedly scan the same 16.2 recorded video lines with attendant tearing apart of the image density; were quadruplex tape to be run, say, at high speed, the quadruplex heads would "hopscotch" from segment to segment of different fields, again with attendant tearing apart of the image display.

A current practice in the editing of magnetic tapes is to transfer to and store taped program material, along with frame time/program identifiers in a random access memory, say as in the CMX Editing System of CBS/Memorex. Such an editing system employs 20 disc recording surfaces, each capable of storing five minutes of skip field (or 2½ minutes of full frame) "2 mHz" video information; and monitor apparatus capable of displaying frame and time information. Selectively, editing decisions for splicing tapes, for lap-and-dissolving scenes, etc. are made by viewing the monitor.

SUMMARY OF THE INVENTION

The present invention permits a tape of segmented video to be replayed by a recorder at a variable speed without causing the image on a display monitor, cooperative with apparatus employing the invention, to tear apart. At the heart of the invention are three provisos: (1) the slaving of the drive of an ancillary record medium (at a multiple or submultiple of the speed of and) to the tape scanning apparatus, (2) the relegating of respective record tracks of the ancillary record medium to each segment of a recorded field; and (3) the recording of video information on the ancillary record only when such information attains a predetermined quality, e.g., SNR. By periodically switching the record head(s) cooperative with the ancillary medium—which may be a disc, drum, tape loop, etc.—into a playback mode, and applying the playback signals so produced to a monitor, the monitor will produce coherent images, regardless of the speed at which the taped program material is run. How and why this is possible will be discussed later. In this regard, the invention is presented, first in a relatively simple form, then with reference to variations thereof, and finally with respect to an actual implementation.

The invention will be described with reference to the Figures, of which:

Figure 3A:
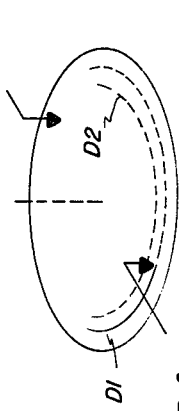
Figure 3B:
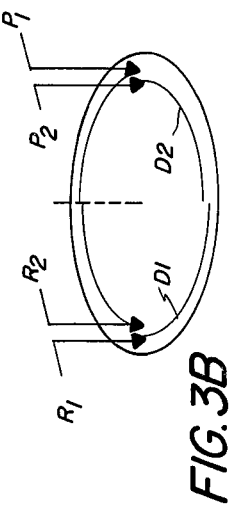
Figure 3C:
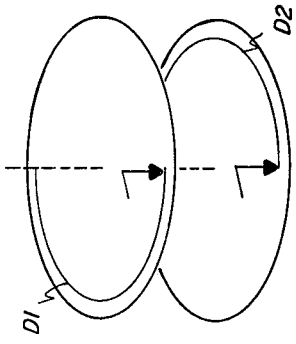
Figure 3D:
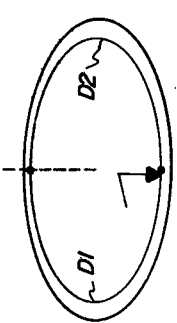
Figure 4:
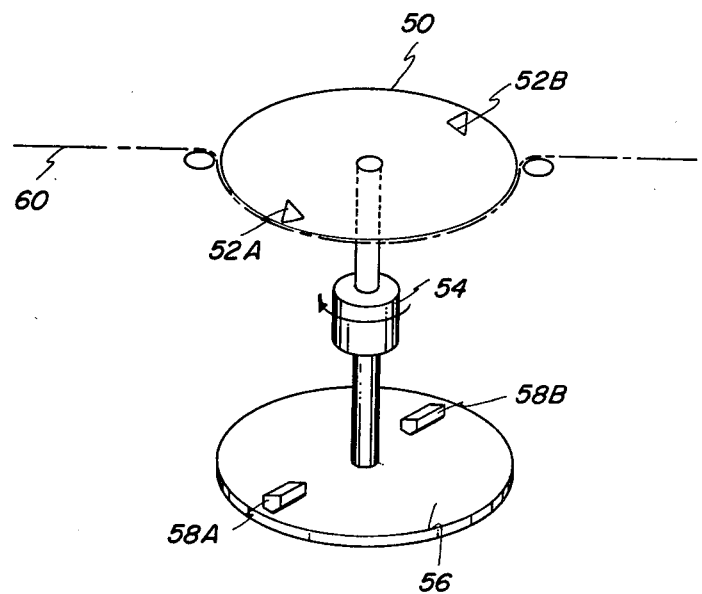
Figure 5:
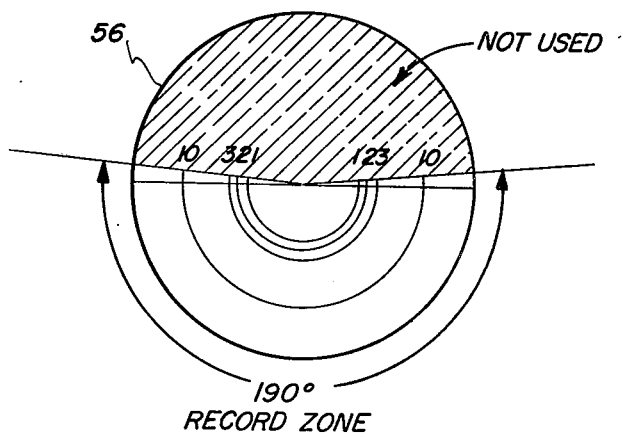
Figure 6:
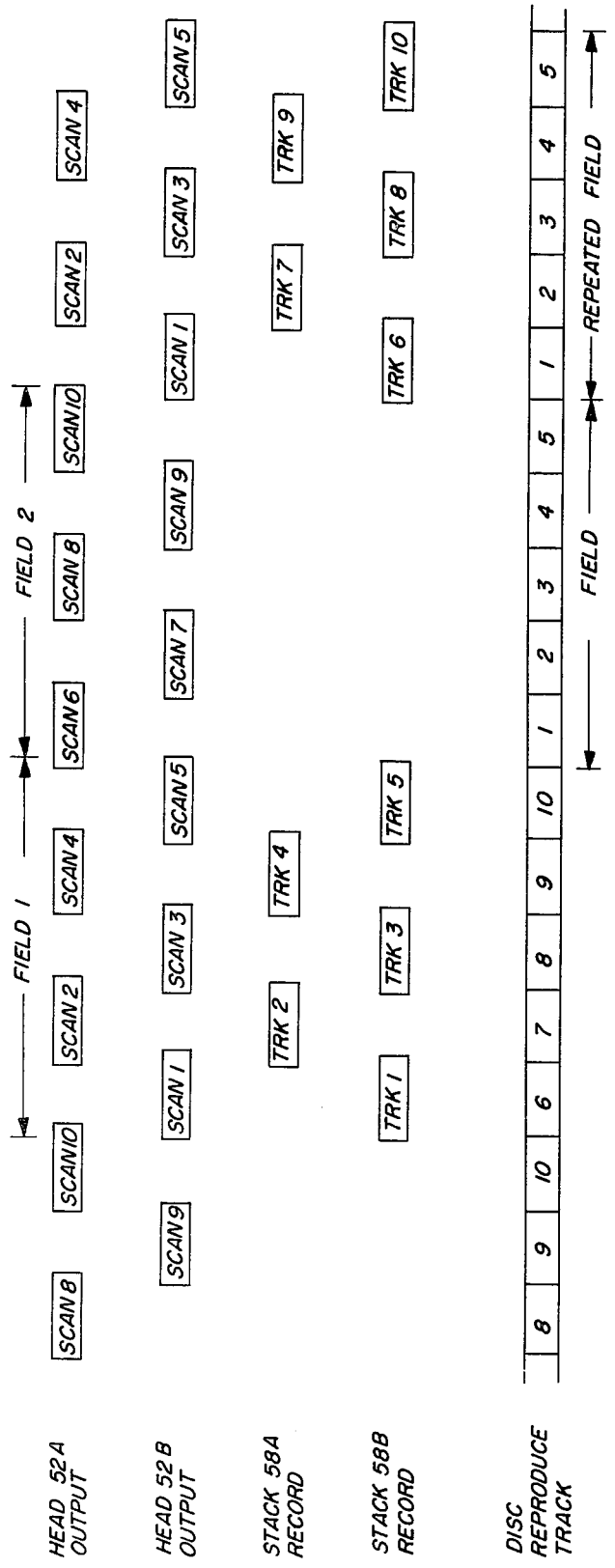
Figure 9:
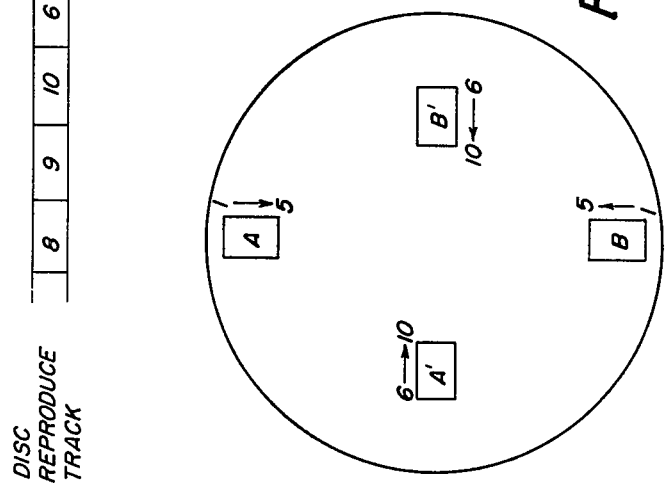
Figure 7:
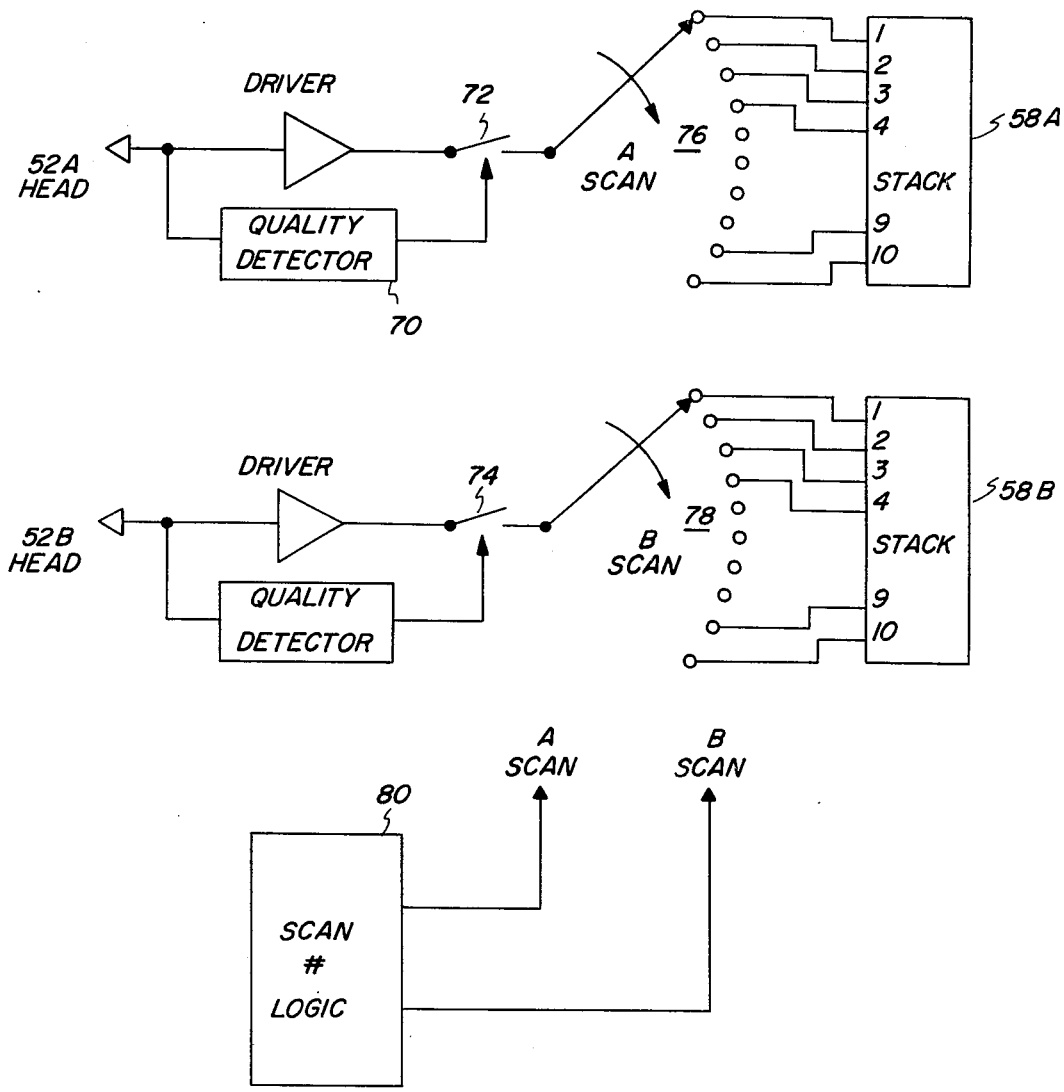
Figure 8:
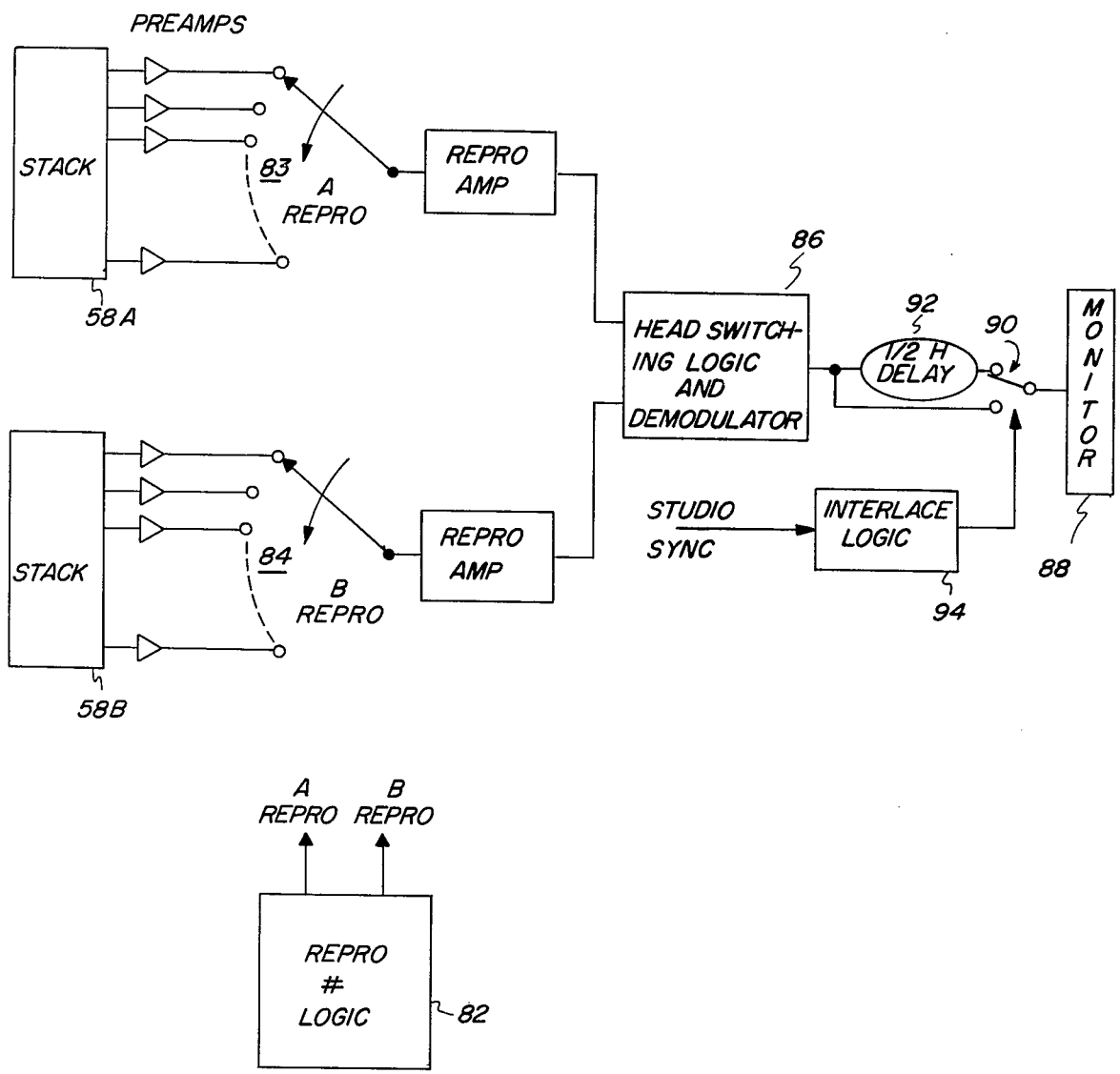
Figure 10:
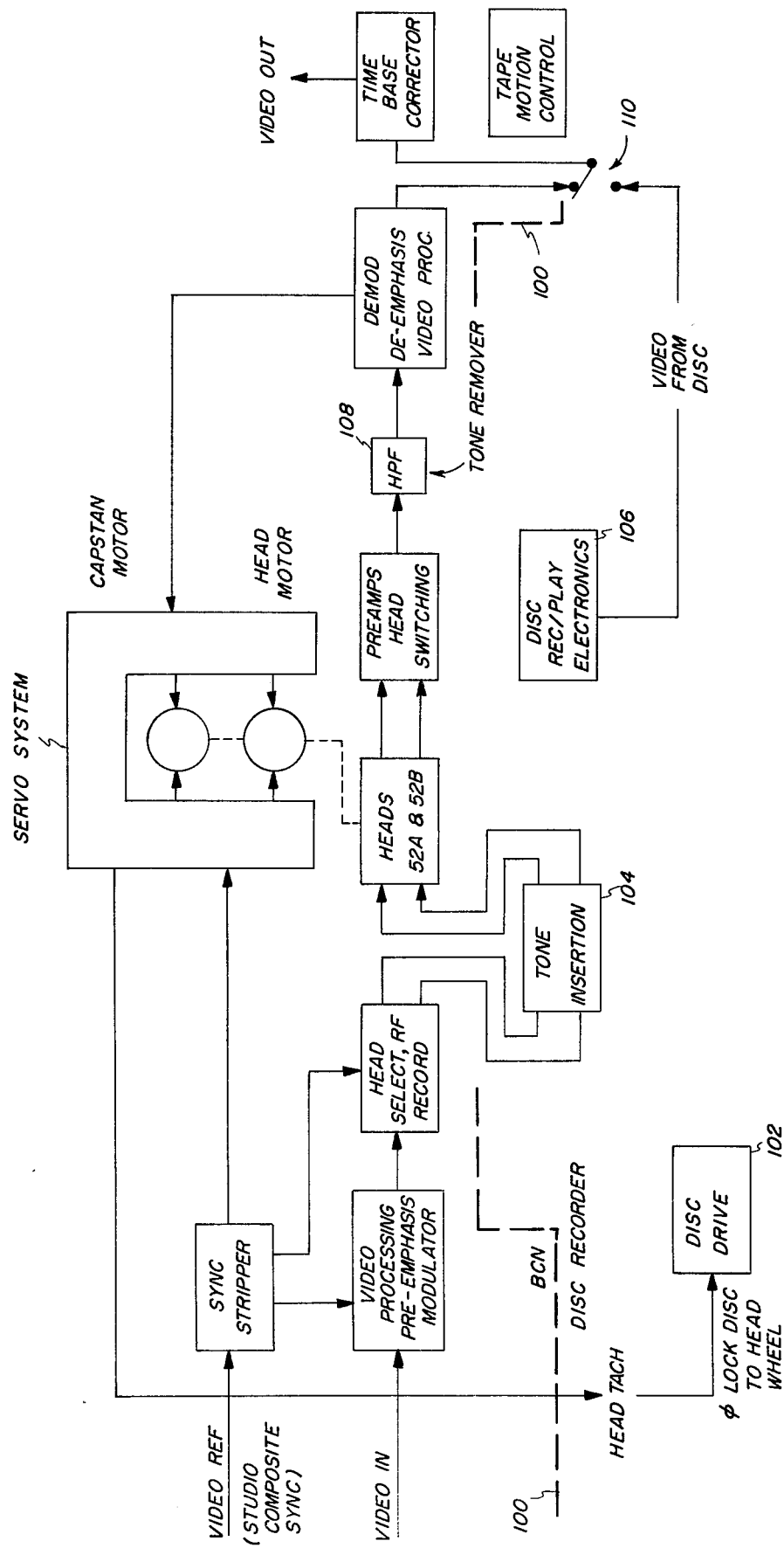
Figure 11:
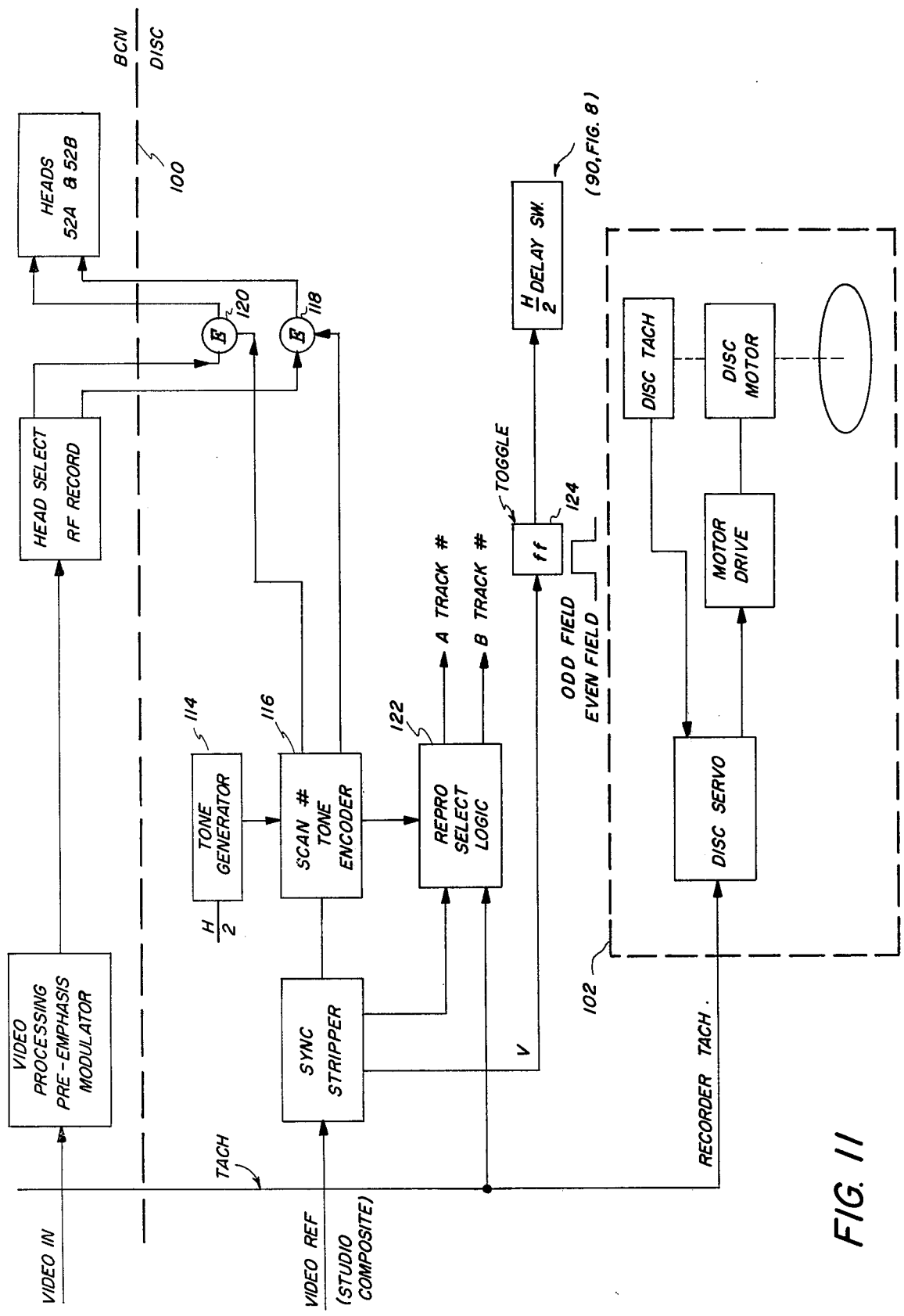
Figure 12:
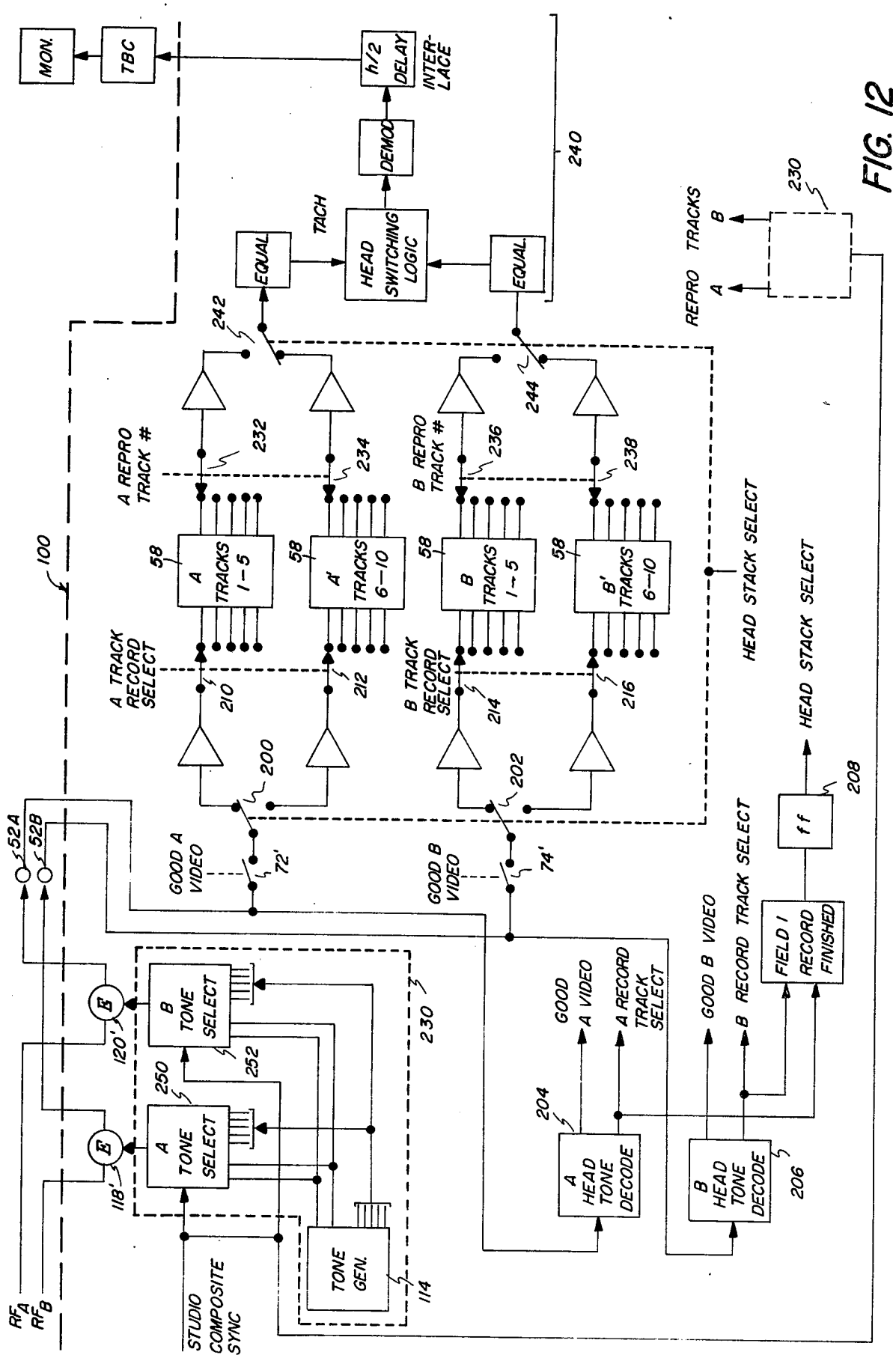
Figure 13:
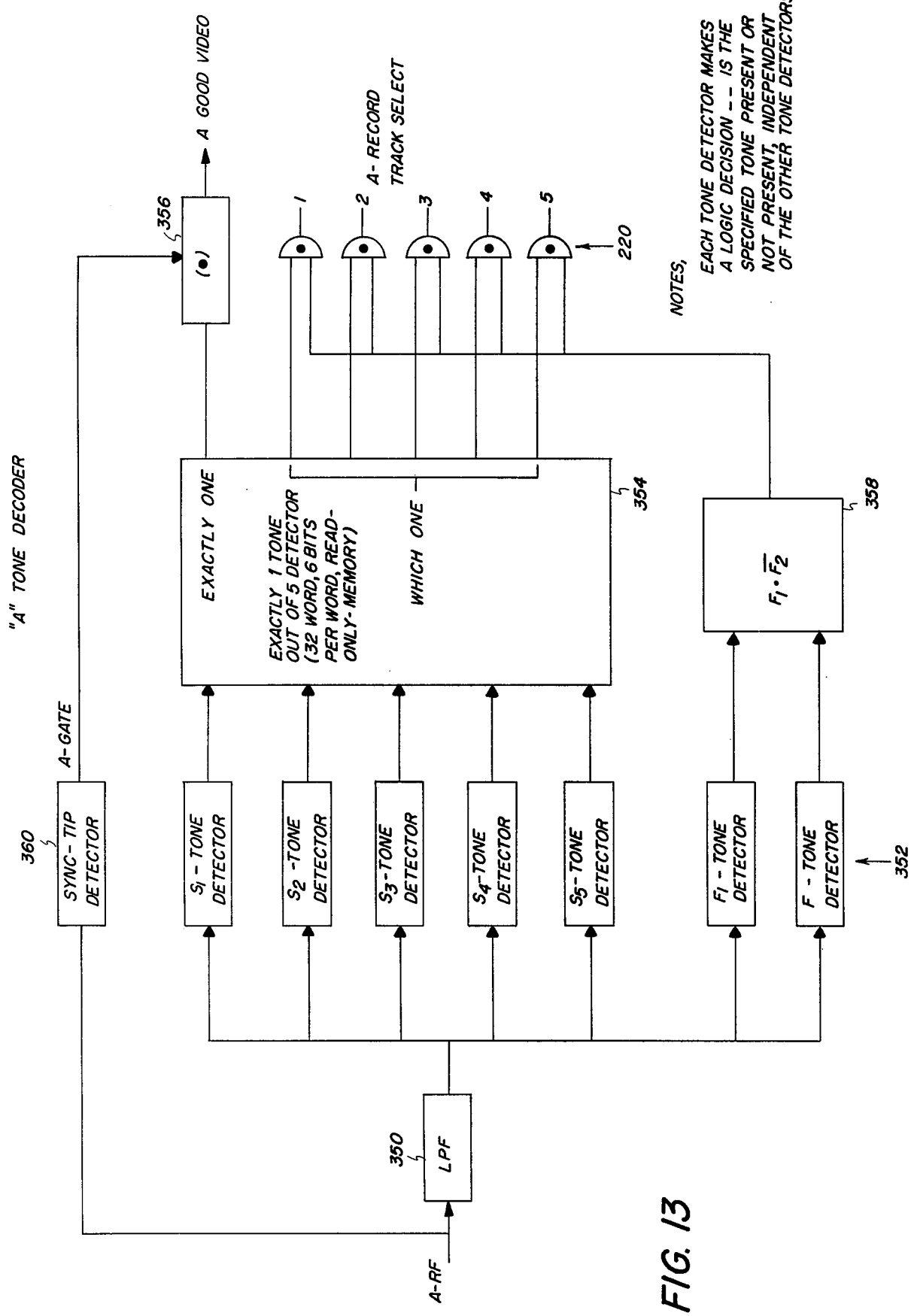
Figure 14:
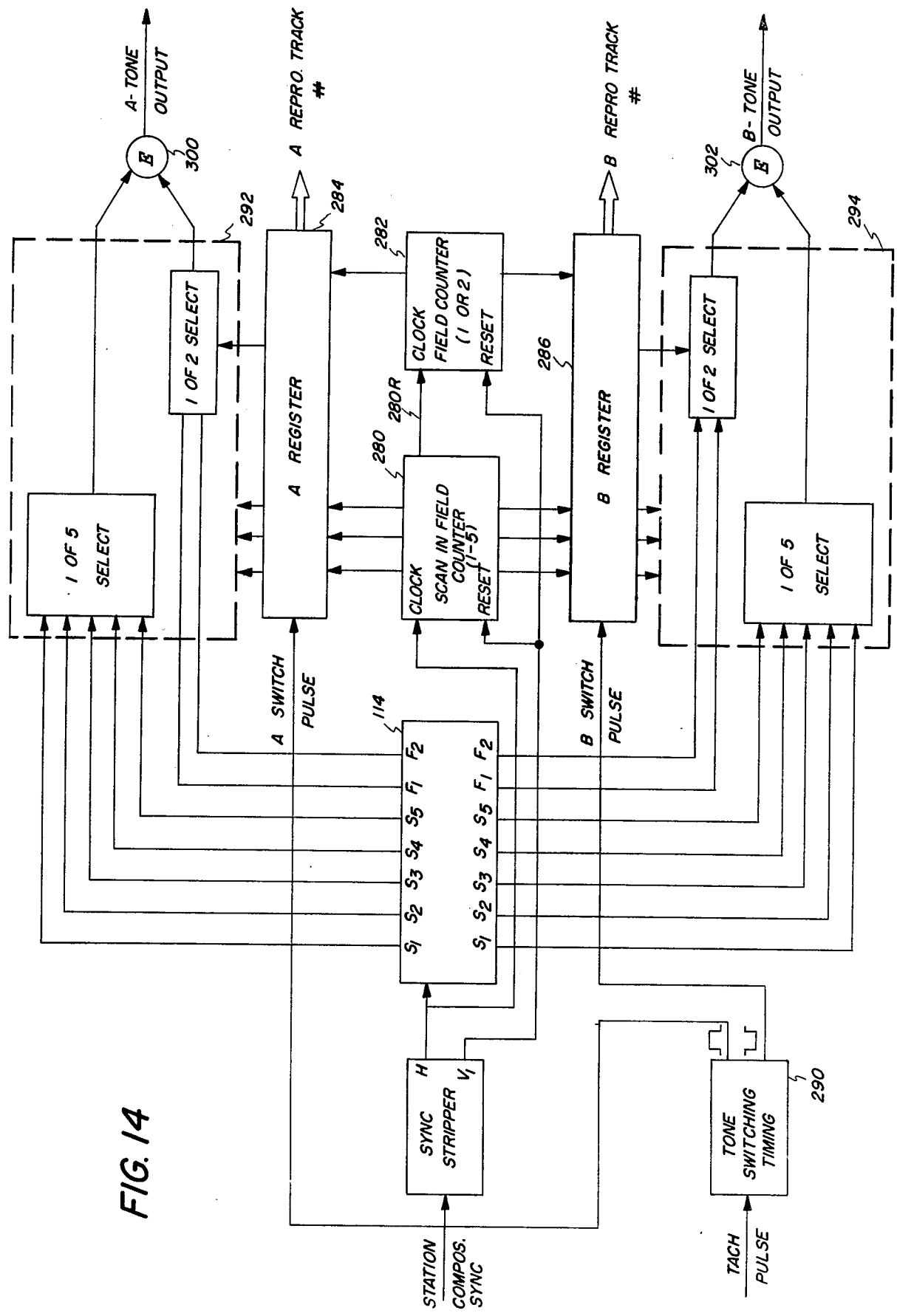
Figure 15:
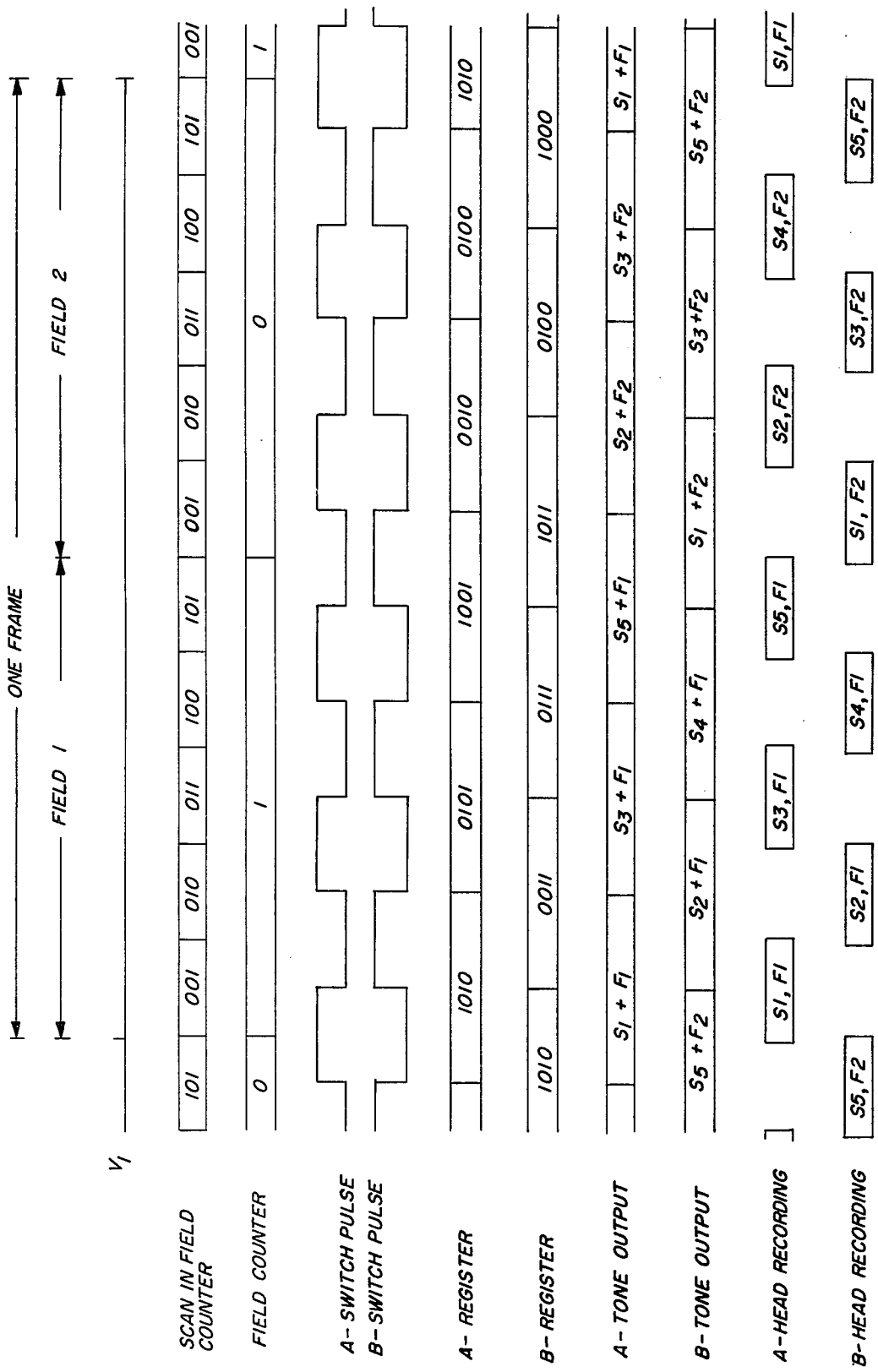

FIGS. 3A-3D illustrate various modifications according to the practice of the invention, FIG. 4 is a perspective view illustrating one form of scanning wheel-to-disc slaving according to the invention, FIG. 5 is a schematic showing of a disc made in accordance with the invention as practiced by the apparatus of FIG. 4, FIG. 6 is a timing diagram useful for an understanding of apparatus according to the invention, FIG. 7 is a schematic block diagram illustrating the disc record function as practiced by the invention, FIG. 8 is a schematic block diagram illustrating the disc play function as practiced according to the invention, FIG. 9 is a schematic showing of a presently preferred arrangement of multitrack heads for practicing the invention, FIG. 10 is a general block diagram illustrating the interconnection between a commercially available video recorder and apparatus according to the invention, FIG. 11 is a block diagram illustrating in greater detail the apparatus of FIG. 10, FIG. 12 illustrates a presently preferred implementation of the invention, FIG. 13 is a schematic block diagram illustrating tone decoding logic for practicing the invention, FIG. 14 is a schematic block diagram illustrating tone select logic useful in the practice of the invention, and FIG. 15 is a timing diagram useful for understanding the operation of apparatus disclosed in FIGS. 9-14.

Figure 1:
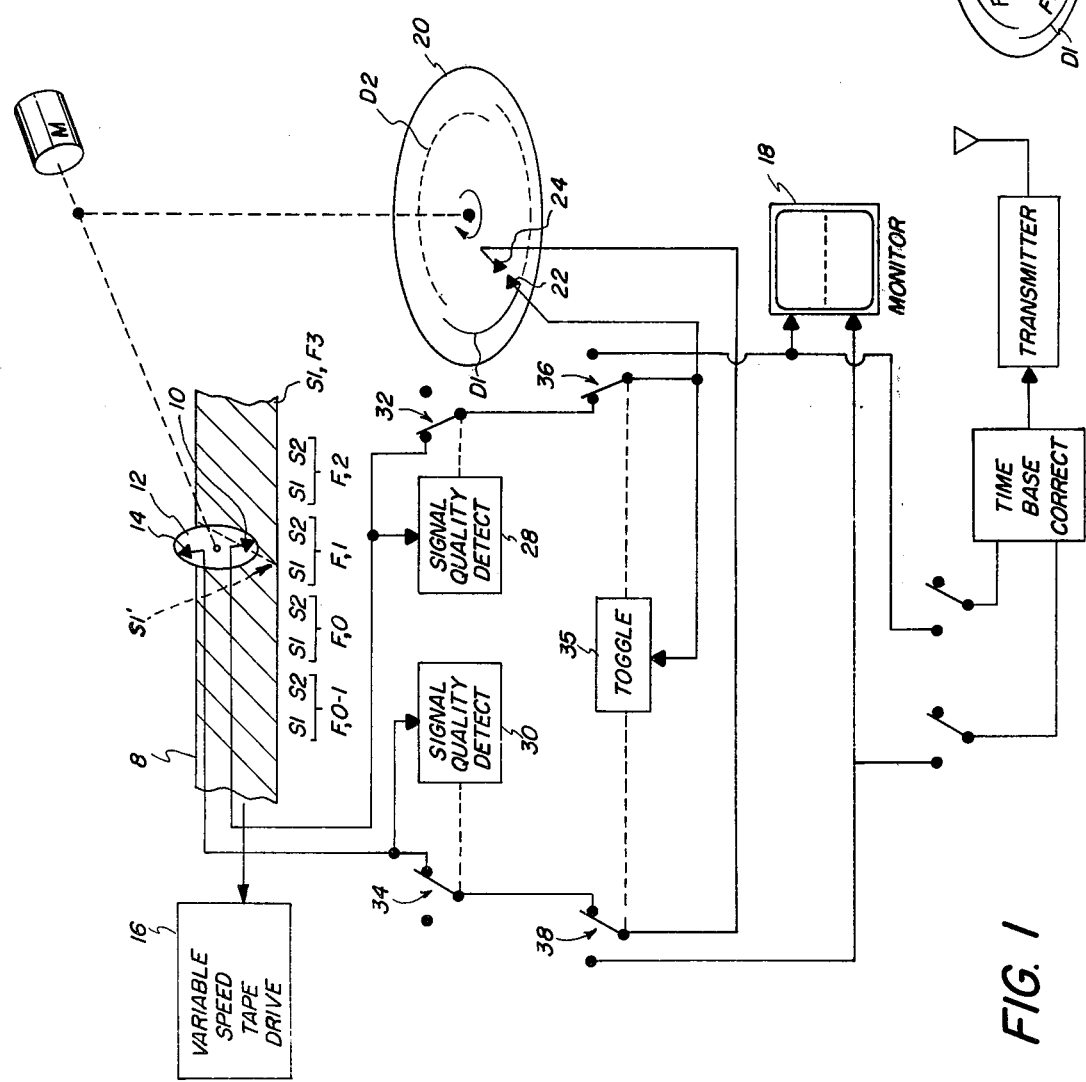
FIG. 1 is a block diagram illustrating the general concepts of the invention.

With reference to FIG. 1, consider a simple segmented frame helical recorder in which each recorded frame is comprised of two recorded scan tracks on magnetic tape 8. (In this embodiment, in the interest of explaining the concept(s) of the invention, no attention is paid to such known techniques as plural fields per frame and the interlacing of fields, as is the practice in commercial television.) As shown, a scan track S1 is traversed by a head 10 of a scanning assembly 12; at the instant the head 10 leaves the scan track S1 a head 14 starts to traverse a scan track S2. The scanning assembly 12, during both record and playback, maintains a uniform head-to-tape speed. In the embodiment of FIG. 1, the scan tracks S1 and S2 comprise a video frame F1, the scan track S1 corresponding to the top half of a scene, and the scan track S2 corresponding to the bottom half of that scene.

Were the tape 8, which is driven by a variable speed tape drive 16, run at precisely the recording speed, signals produced by the heads 10, 14 could be applied directly to a monitor 18 to produce a coherent display. In the editing (and similar) function, however, high, low, and stop tape speeds are dictated: By slaving, e.g., by a direct linkage, an ancillary record medium such as a magnetic disc 20 to the scanning assembly 12, line-to-line correspondence is assured between the tape and disc, regardless of the frame being instantaneously recorded. By providing a particular disc track D1 (head 22) for the top half of a scene, e.g., the scene half corresponding to the scan track S1, and a different disc track D2 (head 24) for the lower half of a scene, e.g., the scene half corresponding to the scan track S2, the heads 22, 24 will, when playing back disc-recorded information, always produce signals which are properly timed in relation to their position within a frame displayed on the monitor 18.

Signals produced by the scanning heads 10, 14 are applied respectively to detectors 28, 30—which may for example be envelope detectors—and—so long as the detected signals are of sufficient quality, say, in terms of SNR—such signals are applied to heads 22, 24. In the event the signals read from the tape are weak, the detectors 28, 30 actuate respective switches 32, 34 to prevent low grade signals from being recorded on the disc 20.

Consider now that the tape 8 is played back while running at its record speed: The head 10 picks up the signal recorded on the segment scan S1 and applies it to the head 22 for recording on the disc track D1. Since the tape is running at its record speed, the head 10 runs right along the segment scan S1 and produces a good quality signal. Similarly, the head 14 runs along and produces a good quality signal from the segment scan S2 for recording on the disc track D2. As the head 10 starts along the segment scan S1 of the next frame F2, switches 36, 38 are toggled (35), thereby preventing the F2 segment scan signals from being applied to the disc 20 while, simultaneously, causing the disc heads 22, 24 to play back "skip frame" segmented video information. In providing skip frame playback, the D1 disc track information is first read by the head 22 and applied to the monitor 18 to paint in the top half of the frame F1 on the monitor; then the disc track D2 information is read by the head 24 and applied to the monitor 18 to paint in the lower half of the F1 frame. As soon as the scanning head 10 starts to track along the segment scan S1 of the frame F3, the switches 36, 38 are again toggled, removing playback signals from the monitor 18, and causing the frame F3 segment scans to be recorded over the F1 segment scans.

Figure 2:
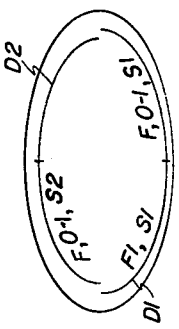
FIG. 2 illustrates a disc recording made while practicing the invention.

Now consider the case of a stopped tape, such as a case in which the scan head 10 starts along, and at the beginning of, segment scan S1: Under such a situation, the head would travel vis-a-vis the tape 8 along the path S1' (see FIG. 1) and attendantly a good scan signal would only be produced by the head 10 for part of the F1, S1 scan. As soon as the signal dropped below a certain quality level, the detector 28 would actuate the switch 32, thereby causing the disc track D1 to comprise S1, F1 information for part thereof, and S1, F0-1 for the remainder thereof. Similarly, the disc track D2 would comprise S2, F0-1 information. (See FIG. 2.) Playback of the disc information results in a coherent display comprised of parts of two frames, but since those frames correspond to relatively close, timewise, scene information, the monitor 18 display is quite good. Such good playback is made possible by the transferring, segment-by-segment, of tape information to respective tracks of the disc 20 while assuring that the disc segments are formed of only good quality signals, without regard to the originating frame of such signals.

High speed playback of the tape 8 similarly produces a coherent display on the monitor 18 . . . such display, however, being formed of signal information from a number of frames dependent on the rate at which the tape is run, i.e., the disc track D1 may comprise the first 10 lines of frame F40, the 11–20 lines of frame F30, the 21–30 lines of frame F20, etc. . . . the point being that the disc 20 in both of its tracks D1 and D2, only records up-dated scene information which is represented by good quality signals.

As noted in FIG. 3 (A to D), the invention is not restricted to the use of side-by-side disc heads but, indeed, may employ heads at different radial positions about the disc (FIG. 3a), thereby effecting side-by-side disc tracks; or the disc may be run, say, at ½ speed relative to the head wheel scanning speed, in which case, typically, the track D1 would be laid down (record head R1) followed by the laying down (record head R2) of track D2—playback in this embodiment being effected after a skip frame, by playback heads P1, P2; or, as in FIG. 3c, the embodiment of FIG. 1 can be effected by playing the D1 and D2 tracks on respective discs; or, as in FIG. 3d, a single head may be employed to lay down a single disc track which in effect is comprised of two discrete semicircular disc tracks which run into each other, etc. What is common to the techniques disclosed in connection with FIGS. 1 and 3 is that each discrete track on the ancillary record equates with one segment scan on the tape 8, and since the ancillary record and tape are slaved to each other there is line-to-line correspondence between the ancillary record and the angular rotation of the scanning assembly 12. Such being the case, the assurance that only "quality" information is recorded on the ancillary record means that the ancillary record during playback will produce a coherent display on the monitor 18.

With the above as background, the invention will now be described in relation to its use as an editing machine designed for cooperation with a helical recorder such as the BCN recorder mentioned above:

Although the BCN recorder will be indicated in more detail below, it is here noted that the BCN recorder is a helical scan video tape recorder, the head wheel of which has two heads and runs at 9000 RPM, the tape having a 190° wrap about the head wheel. Such being the case, the head wheel during recording lays down five segment scan tracks (52 video lines per segment scan) on the tape for each recorded video field (ten segment scan tracks for each recorded video frame).

Reference should now be had to FIG. 4 in which the BCN head wheel 50—with its diametrically opposed record/play heads 52A, 52B—is shown driven (at 9000 RPM) by a motor 54 which also drives a magnetic disc 56 (also at 9000 RPM). Diametrically opposed multi-track heads 58A, 58B (hereafter sometimes referred to as stacks)—which stacks also function selectively as both record and play heads—cooperate with the disc 56. In this embodiment, each head 58A, 58B is a ten-track head; and the heads 58A, 58B are so aligned that either may record in and read from the stacks of the other. See FIG. 5. Thus, one field of a conventional "two fields per frame" video signal may be accumulated in one set of five disc tracks, scan-by-scan, while a different complete field is displayed from signals produced from the other five tracks of the disc 56. By disabling the record function of the head stacks 58A, 58B periodically, skip field playback of the video information on the tape 60 of the recorder may be effected.

Before addressing the disc record and reproduce switching logic, it is considered appropriate to describe first, in terms of the timing diagram of FIG. 6, the functions of the multitrack heads 58A, 58B in relation to the BCN heads 52A, 52B when the BCN tape drive is running at "record" speed: Consider the first field of a video signal produced by heads 52A, 52B: The first segment scan signal is switched to the first disc track via the head stack 58B; the second segment scan signal is switched to the second disc track via the head stack 58A; the third segment scan signal is switched to the third disc track via the head stack 58B; etc. Importantly, while the head stack 58B records in the first disc track, that head stack reads the video information previously recorded in track 6, etc. During the first segment scan of the second tape recorded field (segment scan 6)— which is one field later than the time when the first field was recorded on the disc—the first field is read by switching between the head stacks 58A, 58B. While playing back the first field, the head stacks 58A, 58B are disconnected from the heads 52A, 52B therefore, no "second field" signals (from segment scans 6-10) are recorded on the disc 56 at this time. After additional disc rotation, i.e., during the first field of the next video frame, the connections between the heads 52A, 52B and the head stacks 58A, 58B are remade, during which time playback of the field recorded in disc tracks 1-5 is repeated.

Now keeping in mind the one-to-one correspondence of the video lines of the segment scans and the disc tracks, and referring to FIG. 7, disc recording of the segment scans is effected as follows: Assuming the head 52A produces a segment scan signal of adequate quality (as determined by a detector 70) it is applied via a switch 72 to the head stack 58A for recording in one of the ten disc tracks. Similarly, the head 52B cooperates with the head stack 58B to record via a switch 74 quality signals in one of the ten disc tracks. Disc track selection switches 76, 78 cooperate with the head stacks 58A, 58B and index (at least in the case of playback at record speed) as the recording of each track on the disc is completed. Because the BCN recorder heads 52A, 52B—for about 10° of head wheel rotation—simultaneously reproduce play signals, the switches 76, 78 are independently indexed. That is, the switch 78 will, for example, index while the head stack 58A is still recording a track on the disc. Such indexing is effected by keeping track of the segment scans using a scan number logic 80 to be discussed later.

Reference should now be made to FIG. 8. Since the scan number logic 80 of FIG. 7 keeps track of which segment scan is recorded in which disc track, logic 82—also to be discussed later—keeps track of which disc track is to be reproduced at a given time. The logic 80, 82 functions are complementary. As in the case of overlapping segment scans on the tape, the disc tracks correspond to 190° of the disc whereas the head stacks 58A, 58B are 180° apart. Thus, the logic 82 indexes track selecting switches 83, 84 independently . . . the selection of the appropriate 180° of a disc track being effected by a head switching circuit 86 as is the practice in the art. As the switches 82, 84 successively index to produce five disc recorded segment signals corresponding to field one of a frame, those segment signals are applied to a monitor 88. At the completion of that field one, and in response to a vertical sync pulse produced by studio composite sync, a switch 90 is toggled by logic 94 to insert an h/2 delay 92 between the disc and monitor. Therefore, since each disc recorded field is played twice (see FIG. 6) the first field is interlaced with itself on the monitor 88.

PRESENTLY PREFERRED PRACTICE OF THE INVENTION

In a presently preferred form of the invention, two techniques which have heretofore not been discussed are employed:

The first technique is to effect, in the tape recording made "by" the BCN recorder, segment and field identifier information. In particular, the BCN recorder is caused to record two respective tone signals (each outside the RF passband of interest) for each segment scan, one tone identifying which of two fields is being recorded and the other tone identifying which of the five segment scans is being recorded by the BCN recorder. Thus, seven tones are employed to identify the ten segments of each tape recorded video frame. Aside from this, the tones serve to indicate whether good quality signals are being played back by the BCN i.e., scanning along a segment scan will produce the field tone and one segment tone, whereas scanning between tracks (as may occur during BCN playback at other than the record tape speed) will produce a field tone and two segment tones.

The other general technique worthy of note is that the two ten-track heads as discussed in connection with FIGS. 4-8 have been split into four five-track heads (see FIG. 9), thereby to preclude the same head stack from both playing and recording simultaneously.

Referring to FIG. 10, the BCN recorder, modified to accommodate the invention, appears to one side of a dashed line 100 and, as noted above, forms no part of the invention. To the other side of the line 100, however, apparatus (which will sometimes be called a disk recorder) for implementing the invention is depicted, such apparatus deriving signals from the BCN recorder for processing by the disc recorder:

In this embodiment, rather than the direct coupling between the tape and disc drives for slaving the drives together, the disc drive (102) is phase-locked to the head wheel of the BCN recorder. As noted above, also, the signals which are to be recorded by the BCN heads 52A, 52B are applied to a tone insertion circuit 104, and returned after tone insertion to the BCN recorder for recording on tape.

During operation of the BCN recorder, while practicing the invention, the head (52A, 52B) output signals are applied as noted generally above, and more particularly below to disc record/play electronics 106. (To effect conventional playback from the BCN recorder, a tone removing high pass filter 108 is incorporated in the BCN recorder; and a switch 110 is provided.) For playback to a monitor as part of the editing function, the disc electronics 106 applies interlaced skip field disc signals, via the switch 110, to the BCN time base corrector, and thence to a monitor, not shown in FIG. 10.

Referring now to FIG. 11, the disc servo system 102 is depicted, as well as the tone encoding and insertion apparatus. Seven tones (each of an odd multiple of h/2 rate) are available from a tone generator 114. Since studio composite sync is applied to both the BCN recorder and to the disc recorder of the invention, a tone encoder 116 logically decides which tones are to be selectively inserted (summers 118, 120) during the recording of the respective BCN tape tracks. And, since the disc recorder both records and plays in synchronism with the BCN recorder—which like the disc recorder is synchronized to the studio composite sync—logic 122 effects selection of which head stack, and which disc track, is to be played back at a given time.

Vertical sync, derived from the studio composite signal, effectively determines whether the field being played from the disc is to be an odd or even field. That is, the vertical sync pulse V toggles a flip-flop 124 to actuate the switch (90, FIG. 8) for h/2 delay insertion to effect skip field interlacing.

Turning next to FIG. 12, the apparatus of FIGS. 9–11 is shown in still greater detail: For a description of the operation of the apparatus of FIG. 12, however, it is thought best to consider the disc record and reproduce functions first. As good video is produced by the BCN heads 52A, 52B, such video is applied via switches 72', 74' to head stack selecting switches 200, 202 which direct the good video to appropriate tracks of the disc. Selection of which disc track receives the video to be recorded is determined by a record track select function produced by decoding the tape recorded tones (204, 206). The record track select function effects indexing of the switches 210, 212, 214, 216; and, as is the case with such switches and other components hereof, these may take a variety of forms. After each set of five successive tones is detected, a flip-flop 208 is actuated. This causes any good video which is being received to switch to a different set of five disc tracks (during which time the video just recorded is reproduced). To be noted is that "good video" as identified in FIG. 12 is video which is both of a certain quality "and" which is derived from the first field of a tape recorded frame. (See the logic functions provided by the gates 220 of FIG. 13). Therefore, during each second field of each frame, the switches 72', 74' are open.

Because of the overlap of the segment scans on the disc, the selection of reproduce tracks, as noted above, must be independent of the record track selection. To this end, reproduce track selection is provided by logic 230 forming—as will be discussed later—part of the tone insertion apparatus used for segment scan encoding. (In the interest of clarity, the circuit 230 is shown at two places in FIG. 12). Since studio sync effects assignment of tones to the BCN segment scans, and since the disc and head wheel are slaved to each other, such "assignment" is employed to effect selection, via switches 232, 234, 236, 238, of the reproduce tracks. (This is to be distinguished from the record track select function which requires tone decoding to determine track selection . . . a requirement resulting from the possibility that a recorded field may comprise video line information from several segment scans.) Toggling of the outputs of the heads 58AA', 58BB' to the disc play electronics 240 is provided by switches 242, 244 which are actuated by the head stack select logic (flip-flop 208). Note should be taken that the switches 200, 202 operate 180° out of phase with the switches 242, 244, thereby to provide recording in one of a set of five tracks while reproducing from one of a different set of five tracks as noted in connection with the timing diagram of FIG. 6.

Turning now to the BCN recording function, and in particular to the encoding of the BCN tape segment scans by means of tones, the tone generator 114 applies its two field and five segment tones to logic 250, 252 for assigning tones to the respective tape segment scans . . . such logic being, as noted above, controlled by studio sync. As a pair of tones together alternately exit from the logic circuits 250, 252, they are combined (summers 118', 120') with the RF video being applied to the BCN heads 52A, 52B. FIG. 14, in combination with the timing diagram of FIG. 15, provides greater detail as to the workings of the circuit 230: The composite sync H pulses are applied to the tone generator 114 to effect seven discrete tones all of which are of an odd multiple of the h/2 frequency. Each tone corresponds to either one of two field identifiers or one of five segment scan identifiers, as noted above. A clock/counter 280 receives the studio H sync pulses and keeps track of which segment within a field is being recorded by the BCN recorder; and a clock/counter 282 keeps track of which field of a frame is being recorded by the BCN recorder. The instantaneous counts of the counters 280, 282 are applied to registers 284, 286, the count of the counter 280 being changed at the start of each tape segment scan and the count of the counter 282 being changed after every five segment scans (line 280R). At the start of, say, the first segment scan of a first video field, the counter 280 is set to "001", and the counter 282 is set to "1". After 52 h pulses (52 being the number of lines per segment scanned) are received by the counter 280, its count becomes "010", the count of the counter 282 remaining at "1". Thus, for "segment scan one, field one", the register 284 will store the count "0011". At the start of "segment scan two, field one", and in response to a timing pulse (290) derived from the BCN head wheel, the register 286 is loaded with the count "0101". Such count-changing continues until the fifth segment scan count (101) has been reset back to the first segment scan count (001), at which time the count of the counter 282 changes. This means that during the second field being recorded by the BCN recorder, the fourth bit of any count in either register 284, 286 is "0". The counts stored by the registers 284, 286 are respectively updated during every 180° of head wheel rotation, the timing being such that each register changes its count while its corresponding BCN head is not in contact with tape. (The vertical sync pulse $V_1$, of the studio composite sync, corresponding to the first field of a video frame, is employed as a reference to set the counters 280, 282 and serves to establish system timing.)

The five segment scan tones of the tone generator 114 are applied to logic circuits 292, 294, as are the field tones. The logic circuits 292, 294 select one of five tone signals, as determined by the counts they respectively receive from registers 284, 286. Although different tones will appear at the outputs of the logic circuits 292, 294, only the proper tones will be processed to the BCN tape record electronics, the other tones being applied to the BCN head which is not in contact with the BCN tape. Similarly, the field tones are selected . . . and combined with the segment scan tones (300, 302) for combining with the BCN RF signals 118', 120' being recorded.

Tone detection and decoding as required for determining disc record track selection, and for determining whether good video is being received from the BCN recorder during playback thereof, is discussed in relation to FIG. 13 which shows one (the A tone decoder) of two identical tone decoders 204, 206 (see FIG. 12):

As the BCN head 52A scans a taped segment scan, a representative tone is generated and isolated by a low pass filter 350. The tone output of the low pass filter 350 is applied to seven tone detectors, identified generally as 352; and each tone detector produces a bit signal whenever it receives a tone signal. The segment scan tone detectors 352 apply their bit signals (as five bit words) to a read-only-memory 354 which has been programmed to provide outputs on six output leads: five of the read-only-memory output leads cooperate with gates 220 (discussed above in connection with FIG. 12); and the other read-only-memory output cooperates with an AND circuit 356. The field tone detector bits are applied to logic 358 which toggles to apply "enable" bits to the gates 220. As noted in the program below characterizing the read-only-memory 354, the read-only-memory (and logic 358) in response to tone representative bits, effects (1) selection of one of five disc tracks for recording segment scan signals, and (2) recording of "quality" segment scan video signals when one, and only one, tone is detected by one of the tone detectors.

| $S_1$ | $S_2$ | $S_3$ | $S_4$ | $S_5$ | | $S_1$ | $S_2$ | $S_3$ | $S_4$ | $S_5$ |
|---|---|---|---|---|---|---|---|---|---|---|
| 0 | 0 | 0 | 0 | 0 | 0 | 0 | 0 | 0 | 0 | 0 |
| 1 | 0 | 0 | 0 | 0 | 1 | 1 | 0 | 0 | 0 | 0 |
| 0 | 1 | 0 | 0 | 0 | 1 | 0 | 1 | 0 | 0 | 0 |
| 1 | 1 | 0 | 0 | 0 | 0 | 0 | 0 | 0 | 0 | 0 |
| 0 | 0 | 1 | 0 | 0 | 1 | 0 | 0 | 1 | 0 | 0 |
| 1 | 0 | 1 | 0 | 0 | 0 | 0 | 0 | 0 | 0 | 0 |
| 0 | 1 | 1 | 0 | 0 | 0 | 0 | 0 | 0 | 0 | 0 |
| 1 | 1 | 1 | 0 | 0 | 0 | 0 | 0 | 0 | 0 | 0 |
| 0 | 0 | 0 | 1 | 0 | 1 | 0 | 0 | 0 | 1 | 0 |
| 1 | 0 | 0 | 1 | 0 | 0 | 0 | 0 | 0 | 0 | 0 |
| 0 | 1 | 0 | 1 | 0 | 0 | 0 | 0 | 0 | 0 | 0 |
| 1 | 1 | 0 | 1 | 0 | 0 | 0 | 0 | 0 | 0 | 0 |
| 0 | 0 | 1 | 1 | 0 | 0 | 0 | 0 | 0 | 0 | 0 |
| 1 | 0 | 1 | 1 | 0 | 0 | 0 | 0 | 0 | 0 | 0 |
| 0 | 1 | 1 | 1 | 0 | 0 | 0 | 0 | 0 | 0 | 0 |
| 1 | 1 | 1 | 1 | 0 | 0 | 0 | 0 | 0 | 0 | 0 |
| 0 | 0 | 0 | 0 | 1 | 1 | 0 | 0 | 0 | 0 | 1 |
| 1 | 0 | 0 | 0 | 1 | 0 | 0 | 0 | 0 | 0 | 0 |
| 0 | 1 | 0 | 0 | 1 | 0 | 0 | 0 | 0 | 0 | 0 |
| 1 | 1 | 0 | 0 | 1 | 0 | 0 | 0 | 0 | 0 | 0 |
| 0 | 0 | 1 | 0 | 1 | 0 | 0 | 0 | 0 | 0 | 0 |
| 1 | 0 | 1 | 0 | 1 | 0 | 0 | 0 | 0 | 0 | 0 |
| 0 | 1 | 1 | 0 | 1 | 0 | 0 | 0 | 0 | 0 | 0 |
| 1 | 1 | 1 | 0 | 1 | 0 | 0 | 0 | 0 | 0 | 0 |
| 0 | 0 | 0 | 1 | 1 | 0 | 0 | 0 | 0 | 0 | 0 |
| 1 | 0 | 0 | 1 | 1 | 0 | 0 | 0 | 0 | 0 | 0 |
| 0 | 1 | 0 | 1 | 1 | 0 | 0 | 0 | 0 | 0 | 0 |
| 1 | 1 | 0 | 1 | 1 | 0 | 0 | 0 | 0 | 0 | 0 |
| 0 | 0 | 1 | 1 | 1 | 0 | 0 | 0 | 0 | 0 | 0 |
| 1 | 0 | 1 | 1 | 1 | 0 | 0 | 0 | 0 | 0 | 0 |
| 0 | 1 | 1 | 1 | 1 | 0 | 0 | 0 | 0 | 0 | 0 |
| 1 | 1 | 1 | 1 | 1 | 0 | 0 | 0 | 0 | 0 | 0 |
| ROM Input | | | | | Exactly One | Which one ROM Output | | | | |

(A sync tip detector 360 AND's with the "one only" output of the read-only-memory 354 to assure that whole lines are recorded on the disc.)

The invention has been described in detail with particular reference to certain preferred embodiments thereof, but it will be understood that variations and modifications can be effected within the spirit and scope of the invention.

What is claimed is:

1. For use with a machine adapted for the playback of segmented field video information recorded on magnetic tape in the form of discrete signal tracks corresponding to the video field segments, each said signal track having recorded therein segment identifier signal information, and each video field being comprised of N segments per field, said machine having a rotary assembly of magnetic heads adapted to scan said discrete signal tracks and produce signals therefrom, apparatus comprising:
   (a) ancillary magnetic recording medium;
   (b) means for slaving said ancillary medium to the motion of said rotary assembly;
   (c) magnetic head means for recording N tracks on said magnetic medium;
   (d) means, cooperative with the magnetic heads of said scanning assembly and with said magnetic head means, responsive to segment identifier signal information produced by said scanning assembly heads, for selectively recording the field segment signals in respective tracks of said ancillary recording medium; and
   (e) means for precluding the recording of signal information on said ancillary recording medium when said signal information has less than a predetermined quality.

2. The apparatus of claim 1 wherein said segment identifier signal information is in the form of discrete characterizing tone signals outside the video bandwidth and wherein said responsive means includes signal tone detector means.

3. A system for use with apparatus usable in the playback of a magnetic tape, said tape having video information recorded thereon, said video information being in the form of frame information and field information, there being one odd and one even video field per video frame, and N signal segments per video field, said signal segments being in the form of signal tracks extending generally across the magnetic tape, and each said track being encoded with segment identifier signal information and signal information indicative of whether a field is an odd or even one, said apparatus having a rotary scanner cooperative with said tape for scanning said tracks to produce video segment signals and field and segment identifier signals, and said system comprising:
   (a) a rotary ancillary recording medium;
   (b) means for slaving the rotation of said ancillary recording medium to the rotation of said scanner;
   (c) magnetic recording means cooperative with said ancillary recording medium for recording at least one grouping of N tracks thereon;
   (d) means responsive to said segment identifier signals for applying the N segment signals of said video fields to respective tracks of said N tracks, the segment signals of one field being recorded over the segment signals of another field; and
   (e) means for assuring that segment signals of only a predetermined quality are recorded on said ancillary recording medium.

4. The system of claim 3 wherein:
   (a) said ancillary recording medium is a magnetically coated disc; and
   (b) the said disc is slaved to rotate at the rotation rate of said scanner.

5. The system of claim 3 including means responsive to said field identifier signals for precluding the recording on said ancillary recording medium of segment signals corresponding to one field of each said video frame.

6. The system of claim 5 wherein:
   (a) said ancillary recording medium is a magnetically coated disc; and
   (b) the said disc is slaved to rotate at the rotation rate of said scanner.

7. The system of claim 3 wherein said magnetic recording means is multitrack magnetic head means.

8. The system of claim 7 wherein said magnetic head means is comprised of at least one pair of multitrack heads diametrically positioned relative to each other and so disposed that either may record in the tracks of the other, and wherein said systems includes means responsive to said segment identifier signals for toggling between said multitrack heads.

9. A system for use with apparatus usable in the playback of a magnetic tape, said tape having video information recorded thereon, said video information being in the form of frame information and field information, there being one odd and one even video field per video frame, and N signal segments per video field, said signal segments being in the form of signal tracks extending generally across the magnetic tape, and each said track being encoded with segment identifying tone signals and tone signals indicative of whether a field is an odd or even one, said apparatus having a rotary scanner cooperative with said tape for scanning said tracks to produce video segment signals and field and segment tone signals, and said system comprising:

(a) a rotary ancillary recording medium;

(b) means for slaving the rotation of said ancillary recording medium to the rotation of said scanner;

(c) magnetic recording means cooperative with said ancillary recording medium for recording at least one grouping of N tracks thereon;

(d) means responsive to said segment identifier tone signals for applying the N segment signals of said video fields to respective tracks of said N tracks, the segment signals of one field being recorded over the segment signals of another field; and (e) means for assuring that segment signals of only a predetermined quality are recorded on said ancillary recording medium.

10. The system of claim 9 including means responsive to said field identifier tone signals for precluding the recording on said ancillary recording medium of segment signals corresponding to one field of each said video frame.

* * * * *

UNITED STATES PATENT AND TRADEMARK OFFICE
CERTIFICATE OF CORRECTION

PATENT NO. : 4,193,098
DATED : March 11, 1980
INVENTOR(S) : James A. Bixby, James U. Lemke and Robert A. Lentz It is certified that error appears in the above-identified patent and that said Letters Patent are hereby corrected as shown below:

In the "Abstract", line 3, "a rotation" should read ---the rotation---.

Column 4, line 64, "stacks" should read ---tracks---.

Column 5, line 66, "82" should read ---83---.

Signed and Sealed this

Seventeenth Day of June 1980

[SEAL]

Attest:

SIDNEY A. DIAMOND

Attesting Officer           Commissioner of Patents and Trademarks